United States Patent
Breinich et al.

(10) Patent No.: US 7,465,064 B2
(45) Date of Patent: Dec. 16, 2008

(54) LIGHT SOURCE FOR AN IMAGE-GENERATING UNIT

(75) Inventors: Herbert Breinich, Hochheim (DE); Kai Hohmann, Babenhausen (DE); Oliver Jakoby, Heusenstamm (DE); Heinrich Noll, Groβ—Umstadt (DE)

(73) Assignee: Siemens Aktiengesellschaft, München (DE)

( * ) Notice: Subject to any disclaimer, the term of this patent is extended or adjusted under 35 U.S.C. 154(b) by 274 days.

(21) Appl. No.: 10/593,191

(22) PCT Filed: Feb. 1, 2005

(86) PCT No.: PCT/EP2005/050427
§ 371 (c)(1), (2), (4) Date: Sep. 15, 2006

(87) PCT Pub. No.: WO2005/091382
PCT Pub. Date: Sep. 29, 2005

(65) Prior Publication Data
US 2008/0198593 A1    Aug. 21, 2008

(30) Foreign Application Priority Data
Mar. 18, 2004    (DE) .................. 10 2004 013 680

(51) Int. Cl.
*F21V 9/00* (2006.01)
(52) U.S. Cl. .................. 362/231; 362/294; 362/800
(58) Field of Classification Search .................. 362/231, 362/230, 800, 294, 234, 257, 630, 631
See application file for complete search history.

(56) References Cited

U.S. PATENT DOCUMENTS
5,864,432 A    1/1999    Deter
(Continued)

FOREIGN PATENT DOCUMENTS
DD    81 884    5/1971
(Continued)

OTHER PUBLICATIONS
2005Q11399 KR; S. J. Ham, M. S. Cho and S. B. Lee; Thermal deformations of CSP assembly during temperature cylinder and power cycling and power cycling; International Symposium on Nov. 30-Dec. 2, 2000; pp. 350-357; XP010532432; ISBN 0-7803-6654-9.

*Primary Examiner*—Bao Q Truong
(74) *Attorney, Agent, or Firm*—Cohen Pontani Lieberman & Pavane LLP

(57) ABSTRACT

The invention relates to a light source (2) comprising at least one light module (13) and one control module (12) provided with a control electronics system. The invention also relates to an image-generating unit (1) for a head-up display provided with an inventive light source (2). Traditional solutions require too much construction space or cannot be mass-produced in order to obtain sufficient brightness. The aim of the invention is to combine a high degree of brightness, little construction space and mass-producibility, particularly for a head-up-display. According to the invention, the light module (13) and the control module (12) respectively comprise their own carrier element (14, 22) and are firmly connected to a common carrier (11). The light module (13) is connected to the control module (12) by means of first electrical lines which are configured in such a way that thermally induced relative movements between the control modules (12) and light module (13) are received in a trouble-free manner by modification of the form of the lines.

46 Claims, 3 Drawing Sheets

U.S. PATENT DOCUMENTS

| | | |
|---|---|---|
| 6,066,861 A | 5/2000 | Hohn et al. |
| 6,245,259 B1 | 6/2001 | Hohn et al. |
| 6,277,301 B1 | 8/2001 | Hohn et al. |
| 6,592,780 B2 | 7/2003 | Hohn et al. |
| 6,613,247 B1 | 9/2003 | Hohn et al. |
| 6,812,500 B2 | 11/2004 | Reeh et al. |
| 2001/0000622 A1 | 5/2001 | Reeh et al. |
| 2001/0002049 A1 | 5/2001 | Reeh et al. |
| 2001/0028053 A1 | 10/2001 | Hohn et al. |
| 2001/0030326 A1 | 10/2001 | Reeh et al. |
| 2001/0045647 A1 | 11/2001 | Hohn et al. |
| 2003/0189830 A1 | 10/2003 | Sugimoto et al. |
| 2004/0016908 A1 | 1/2004 | Hohn et al. |

FOREIGN PATENT DOCUMENTS

| | | |
|---|---|---|
| DE | 689 08 503 | 1/1990 |
| DE | 195 40 108 | 4/1997 |
| DE | 196 38 667 | 4/1998 |
| DE | 198 58 591 | 6/2000 |
| DE | 199 32 051 | 1/2001 |
| DE | 10 2004 041 328 | 3/2006 |
| GB | 801325 | 10/1958 |
| JP | 2002094122 | 3/2002 |

LIGHT SOURCE FOR AN IMAGE-GENERATING UNIT

CROSS-REFERENCE TO RELATED APPLICATIONS

This is a U.S. national stage of application No. PCT/EP2005/050427, filed on 1Feb. 2005. Priority is claimed on the following application(s): Country: Germany, Application No.: 10 2004 013 680.7, Filed: 18 Mar. 2004, the content of which is/are incorporated here by reference.

BACKGROUND OF THE INVENTION

1. Field of the Invention

The invention relates to a light source having at least one light module and one drive module with electronics. The subject-matter of the invention also covers an image-production unit for a head-up display having a light source according to the invention.

2. Description of the Prior Art

Light sources and image-production units of the type mentioned in the introduction are already known from German Laid-Open Specification DE 198 58 591 A1. The stringent requirements, in particular relating to a high level of external light from the environment, on the brightness of the light source to be used for a head-up display, with only a small amount of available physical space at the same time, place major demands on the development process, all the time. The brightness, which is produced by light means, is either so low that a large number of light means, for example normal semiconductor light-emitting diodes, are required, or the individual light means have such a high power loss, which must be dissipated as heat, that the complexity and space requirement for cooling no longer comply with the specified financial and technical constraints.

SUMMARY OF THE INVENTION

An object of the present invention is to provide a light source which can produce particularly high brightness while requiring only a small amount of space, in which case the arrangement is also intended to satisfy the requirements for large-scale production for use for a head-up display in the automotive field.

According to the invention, the problem is solved by the proposal of a light source of the type mentioned in the introduction, in which the light module and the drive module each have their own mount element, specifically with the light module having a first mount element and the drive module having a second mount element, and with the light module and the drive module being connected to a common mount, connected such that they are attached to one another, with the light module being connected to the drive module by means of electrical first lines, which are designed in such a manner that thermally caused relative movements between the drive module and the light module are absorbed without destruction, by deformation of the lines.

One major advantage is the modular design of the light source, which allows additional light modules to be associated with one drive module, depending on the brightness requirements. This modular design complies with stringent requirements for standardization, thus spectacularly reducing the large-scale production costs.

In addition, the association of mount elements with the light module and with the drive module improves the capability to handle these components during installation. In addition, the electrical connection between the drive module and the light module by a first line results in particular advantages, with this first line being designed such that it withstands thermally caused relative movements without destruction. In this context, it is particularly worthwhile arranging these lines in a curved shape, so that the geometry of the curve varies as a function of the relative movement, so that the deformation capability of the material which is used for the first line is subject to relatively minor requirements. The mechanical decoupling of the modular design of the light source according to the invention in particular reduces the magnitude of the thermally caused stresses that occur, in particular during transient thermal processes, thus allowing the use of higher temperature gradients and temperature transients, as well as higher temperature levels. The higher permissible temperatures at the same time reduce the requirements for cooling, and allow a more space-saving design.

According to one embodiment of the inventions, the electrical first lines for connection of the light module to the drive module are in the form of bonding wires. The attachment according to the invention of the light module to the drive module by means of a common mount is the only way in which it is possible to use bonding wires at this point. In this context, it is expedient to provide the corresponding contacts of the drive electronics or of the light module with surfaces which can be bonded, by way of example based on gold-nickel, silver-platinum or silver-palladium. Excellent results have been achieved in wire-pull tests at the temperatures which have to be withstood. For mechanical protection of this connection, the corresponding area can be covered by means of plastic, for example by means of a resin or a silicone gel such as SIL GEL™.

The light source has a long life with a constant light yield at the same time by the light module having at least one semiconductor chip which is arranged on a conductor layer such that it is electrically conductively connected to the conductor layer. The diameter of the semiconductor chip may in this case be up to 1 mm, in which case desired orders of magnitude of the light power can be achieved with a diagonal size of about 0.5 mm. Very good results in terms of brightness and with an acceptable amount of heat being developed can be achieved with the individual semiconductor chips having an area extent of 0.5 $m^2$ to 1.5 $m^2$, in particular about 1 $m^2$, with the power consumption for 1 $m^2$ being about 500 mW.

The light module and/or the drive module can be attached to the mount with little cost by means of adhesive.

The advantages of the modular design according to the invention are fully evident when one drive module has a plurality of associated light modules.

The limits to which the material of the individual components are subject can be made even better use of by arranging a temperature sensor on the drive module and/or on the light module. A good solution in this case is to connect temperature sensors to the light module, which allows the maximum power levels on this main heat source, particularly in the case of transient temperature profiles. In order to reduce the costs of the light modules, a plurality of which normally have to be coupled to the drive module, the temperature sensor can also be thermally coupled to the drive module, which produces considerable power losses. Maximum utilization of the materials is obtained by providing an appropriate temperature sensor system both on the light modules and on the drive module.

The modular design according to the invention allows power consumptions of at least 0.5 watts per semiconductor chip, and is expedient in order to achieve the desired brightness.

In order to increase the thermal load capacity of the light modules further, the conductor layer can be applied to a mount element composed of ceramic. It is worthwhile for this ceramic to be in the form of a thermally conductive hybrid, in particular an aluminum-oxide ceramic ($Al_2O_3$) Good results in terms of the dissipation of heat losses are obtained by the ceramic having a coefficient of thermal conductivity of at least 5 K/W, and expediently being in the form of an electrical insulator. Although the ceramic may be in the form of a first mount element, it is worthwhile in terms of handling capability for the ceramic to be in the form of a third mount element, and to be attached to the first mount element in an intermediate manufacturing step.

In order to withstand the high thermal loads and nevertheless to satisfy the requirements for the electrical lines, it is worthwhile for the conductor layer to be composed at least partially of a mixture comprising silver and platinum. In this case, the conductor layer may have conductor tracks which are connected to that face of the semiconductor chip which points away from the conductor layer by means of at least one second electrical line, which is in the form of a bonding wire.

The conductor layer can advantageously be electrically linked by means of one electrical line to lines which lead to the drive module and are preferably a component of a printed circuit board, with these lines being in the form of bonding wires, so that they can withstand the high temperatures that occur in this case permanently. The link is expediently protected against external chemical and mechanical influences by means of a plastic encapsulation compound.

The light source can be driven in a particularly flexible manner in terms of brightness and color if the light module has a plurality of semiconductor chips, and the conductor layer as well as the connection between the conductor layer and the semiconductor chips are designed in such a manner that at least two semiconductor chips can have an electrical voltage applied to them, independently of one another, by means of the conductor tracks. This allows particularly high dimming rates to be achieved, and particularly high flexibility in terms of the choice of color.

Excellent conductivity at high operating temperatures can be achieved by the conductor layer being composed at least partially of a mixture comprising silver and platinum. During production, this mixture is pasty at least at times, and is preferably applied with silicon dioxide at the intended point, where it is subsequently subjected to a melting process. In order to supply voltage to the semiconductor chips, it is worthwhile for the conductor layer to have conductor tracks which are connected to that face of the semiconductor chip which points away from the conductor layer by means of at least one second electrical line, which is in the form of a bonding wire. A particularly temperature-resistant material, which is also highly conductive at these temperatures, should preferably be chosen for the bonding wire, for example gold. For protection in particular against external mechanical and chemical influences, this arrangement comprising the semiconductor chip and the contact by means of the bonding wire can expediently be coated with a layer of transparent temperature-resistant plastic, for example epoxy resin. At the same time, this coating forms primary optics, which result in initial focusing of the beam path, starting from the semiconductor chip, depending on the shape and design of the background, which is preferably designed to be reflective, on which the semiconductor chip is located.

A highly cost-effective solution, which is technically preferable at the same time, for combination of the individual components of the light module is obtained by the light module having a first printed circuit board, on which the mount element is mounted. In this case, one flat face of the first printed circuit board can rest on the mount, and can preferably be adhesively bonded to it. In order to dissipate the power losses in the form of heat, it is expedient for the mount to be in the form of a heat sink. The connection between the first printed circuit board and the mount should on the one hand be temperature-resistant, and should on the other hand be highly thermally conductive. Aluminum is a cost-effective material for the mount, which is in the form of a heat sink. In the same way, the drive module may have a second printed circuit board, a flat face of which rests on the mount, and can likewise be attached to it.

In terms of the choice of light colors which can be emitted by the means of the semiconductor chips, particularly expedient combinations of semiconductor chips exist for use in a head-up display. In this case, a light module preferably has 1, 2, 3 or 4 semiconductor chips, and this has been found to be particularly worthwhile with regard to the power loss and the brightness that is produced.

The light source described so far can be used particularly advantageously in all variants for an image-production unit, in particular for a head-up display.

Secondary optics are advantageously arranged downstream from the primary optics, which are associated with the light module itself, in the beam path which originates from the light source. These secondary optics may expediently comprise a reflector, with the reflector preferably being designed to be totally reflective, at least in places, thus virtually eliminating optical losses. One particularly cost-effective solution is for the reflector to be composed of a transmissive polymer. In this case, the reflector has an external contour which is essentially in the form of a cone or pyramid, with the cross section of the reflector widening in the main light propagation direction, for beam formation. In detail, it is expedient for the light which emerges from the primary optics of the light module to enter an input side of the reflector, to be virtually exclusively totally reflected in the reflector, and to emerge in a light beam from an output side. In this case, the reflector is particularly advantageously designed for use in an image-production unit according to the invention if it emits a widening light beam which has a boundary surface which forms an angle of about 5°-15° with a central axis which runs centrally through the light beam in the main light propagation direction. This feature can be implemented better if the external contour of the reflector is convex, in which case it has been found to be particularly expedient for the external contour of the reflector to be in the form of a rotational paraboloid which widens in the main light propagation direction, and for the rotational paraboloid to be based on a fifth-order polynomial. The input losses of the reflector can be reduced to a minimum by the provision of a recess, which at least partially holds a light means provided on the light module, on the input side.

If additional focusing of the input light is desired, it is worthwhile for the recess to have an end surface which is arranged opposite the light source in the direction of the central axis and has convex curvature in the direction of the light source.

Particularly if it is desirable for the light source of the image-production unit to emit over an area, it is worthwhile arranging a plurality of reflectors, which are associated with light modules, adjacent to one another. In order to avoid excessive irregularities of the illumination in the area of the junctions between the individual reflectors, it is expedient for the reflectors to have an output surface which allows arrangement alongside one another virtually without any gaps, for example by the output surface being rectangular. In order to avoid inhomogeneities of the brightness distribution over the overall area of the output surfaces of the reflectors occurring despite this, it is expedient for a common light-mixing module to be arranged downstream from the reflectors in the beam path. Depending on the physical space requirements, a translucent display of the image-production unit can be arranged directly downstream from the light-mixing module in the beam path, or with the interposition of a reflector or mirror which folds the beam path. A reflector or mirror such as this also makes it possible to increase the depth impression or the distance impression of the virtual image to the driver in the case of a head-up display. Depending on the focusing effect of the secondary optics, the output area of the secondary optics may be approximately the same size as the display area through which the light can pass. The light-mixing module, which is preferably adjacent to the secondary optics, may expediently be in the form of a box with a light inlet side and a light outlet side, and side walls which reflect inward. The length of extent in the direction of the beam path must be defined as a function of the magnitude of the brightness differences in the area of the output surface of the secondary optics. Any inhomogeneities in the brightness and other visual disturbance effects which originate from the light source or from the secondary optics can be overcome additionally, or in the case of minor differences exclusively as well, by means of a scattering disk which is arranged in the beam path between the light module and the display.

BRIEF DESCRIPTION OF THE DRAWINGS

The invention will be described in more detail in the following text with reference to one specific exemplary embodiment for illustrative purposes. In addition to this exemplary embodiment, numerous other design options will be evident to a person skilled in the art from the invention as described here. In particular, the invention also includes feature combinations which result from combinations of the claims, even if no express back-reference corresponding to them is included. In the figures:

DETAILED DESCRIPTION OF THE PREFERRED EMBODIMENTS

Figure 1:
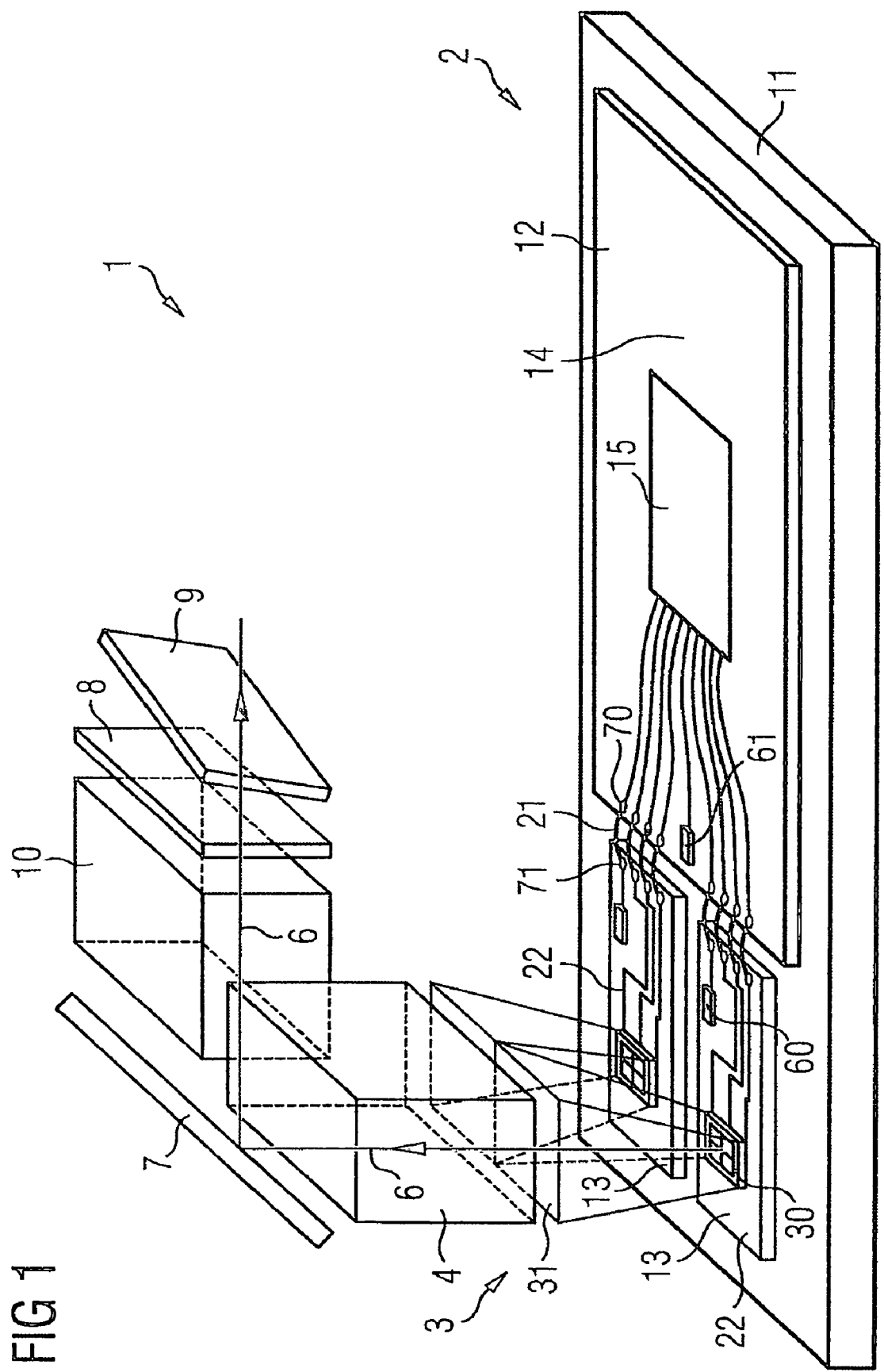
FIG. 1 is a schematic, perspective illustration of an image-production unit according to the invention.

FIG. 1 shows an image-production unit 1 according to the invention with the major components following the beam path 5 originating from the light source 2, in a main light propagation direction 6: the light source 2, the secondary optics 3, the light-mixing module 4, the mirror 7, the scattering disk 8 and the display 9, in which case a light box 10 can also optionally be arranged between the mirror 7 and the scattering disk 8, in the manner illustrated here.

The light source 2 essentially comprises a mount 11, a drive module 12 and light modules 13. The mount 11 is in the form of a heat sink composed of aluminum, on which the drive module 12 and the light modules 13 are adhesively bonded, by an unpopulated flat face. In this case, the adhesive bonding in each case satisfies stringent demands for thermal conductivity and temperature resistance. The drive module 12 has a second mount element 14, which is in the form of a printed circuit board and is fitted with drive electronics 15, illustrated in a highly simplified form. The components that are fitted also include a temperature sensor 61, which feeds the operating temperature back to the drive electronics 15, and in which case the operating power of the light modules 13 is reduced on reaching a specific limit temperature. The drive electronics 15 receive pulse-width-modulated signals from a control unit, which is not illustrated, and convert these signals to an appropriate operating voltage for the individual light modules 13.

The light modules 13 are connected to the drive module 12 by means of first electrical lines 21. The first electrical lines 21 are in the form of bonding wires, extending in a curved shape, as shown by the detail 2a in FIG. 2, from first contacts 70 of the drive module 12 to illustrated second contacts 71 of the light modules 13. The first and second contacts 70, 71 are designed in a suitably appropriate form for connection to a bonding wire. All of the components of the light module 13 are attached to a first mount element 22, which is in the form of a printed circuit board. A light means 24 (FIG. 2) is in each case located on the first mount element 22 of the two light modules 13 and essentially emits light into the secondary optics 3 in the main light propagation direction 6.

The secondary optics 3 have an input side 30, facing the light means 24, and an output side 31, opposite the input side 30. Along the main light propagation direction 6, the secondary optics 3 have a continuously widening rectangular cross section, so that the output side 31 has a larger area than the input side 30. The two illustrated light modules 13 are arranged adjacent but at a distance from one another such that the output side 31 of the secondary optics 3 associated with each of the two light modules are joined to one another virtually seamlessly. The secondary optics 3 are in the form of totally reflective transmissive truncated cones composed of a transparent polymer.

The light mixer, which follows this in the beam path, essentially comprises side walls 42 which bound a light inlet side 40 and a light outlet side 41, with the resultant cross section of the light-mixing module 4 in the main light propagation direction 6 corresponding essentially to the dimensions of the display 9.

A temperature sensor (60, 61) is arranged with a good thermally conductive connection, in each case, on the drive module 12 and on the light module (13). The temperature sensors (60, 61) signal the locally measured temperature to the drive electronics (15), which limit the power consumption as a function of the measurement result, so that the maximum permissible temperatures are not exceeded.

Figure 2:
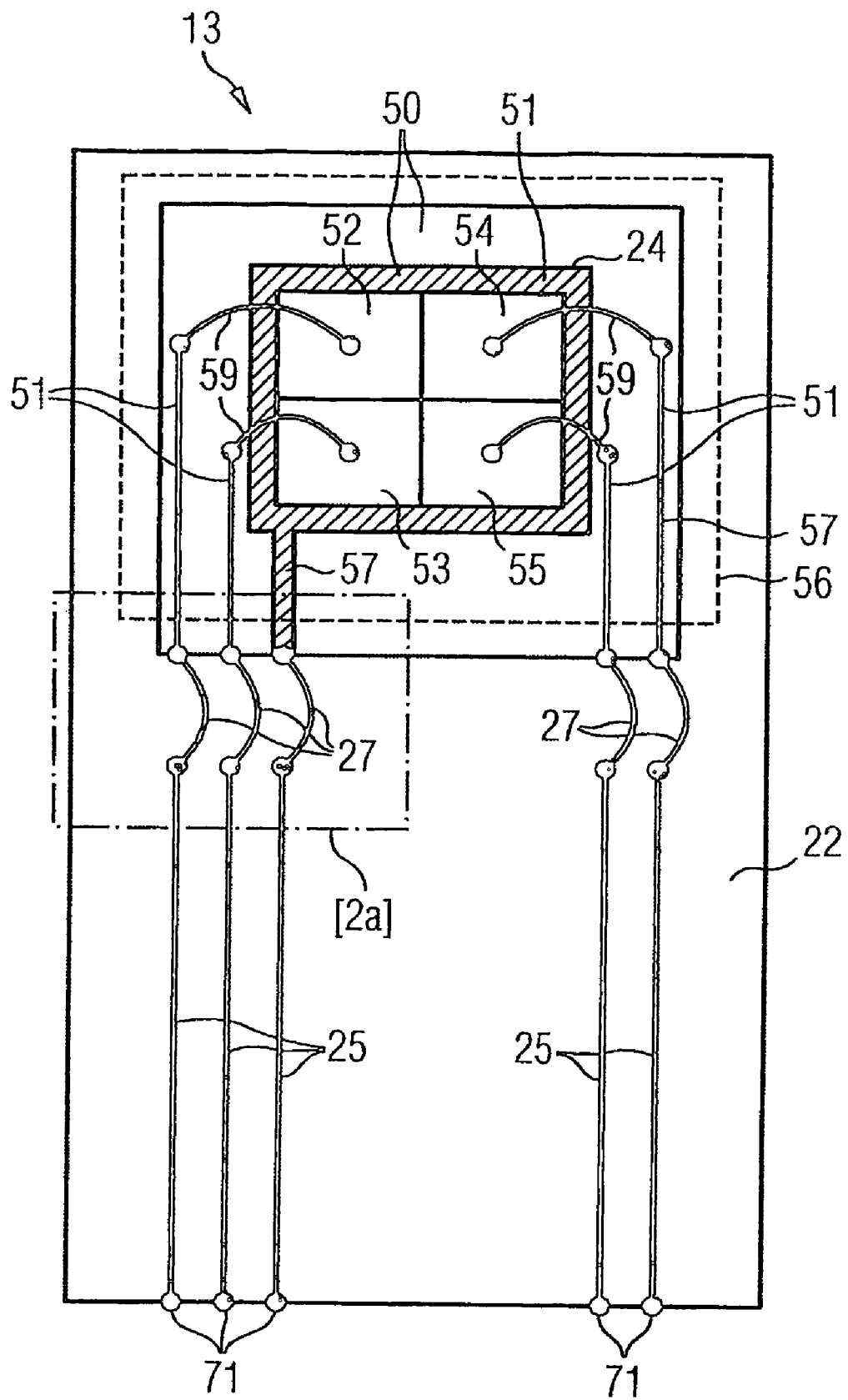
FIG. 2 is a plan view of a schematic illustration of a light module of a light source according to the invention, and FIG. 3a to 3d each show an embodiment of a combination of different color configurations of semiconductor chips for a light module.

The light module 13 which is illustrated in detail in FIG. 2 essentially comprises the light means 24 and second lines 25, with the light means 24 and the second lines 25 being arranged on the first mount element 22, and being mounted on it. The light means 24 are electrically conductively connected to the second lines 25 by means of third lines 27, which are illustrated in the detail [2a] and are in the form of bonding wires. The light means 24 are themselves adhesively bonded on the first mount element 22, which is in the form of a printed circuit board, in a highly thermally conductive and temperature-resistant manner.

The light means 24 have a particularly temperature-resistant third mount element 50, which is in the form of a ceramic platelet composed of aluminum oxide ($Al_2O_3$). The third mount element 50 is a mount for a conductor layer 51, semiconductor chips 52-55 and primary optics 56. The conductor layer 51 comprises a plurality of conductor tracks 57, which are electrically conductively connected to the second lines 25 in the manner already described by means of third lines 27, which are in the form of bonding wires. Some of the conductor tracks 57 open into a contact area, which is provided underneath the semiconductor chips, and others open into a bonding connection 59, which is composed of bonding wires, on the opposite side of the semiconductor chips 52-55. The primary optics 56 are composed of temperature-resistant, transparent plastic, which at the same time protects the bonding-wire connections 59 of the semiconductor chips 52-55 against external mechanical or chemical influences.

Figure 3A:
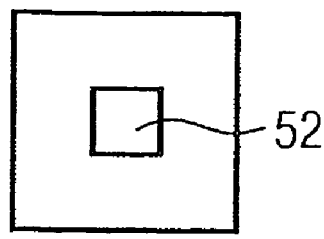
Figure 3B:
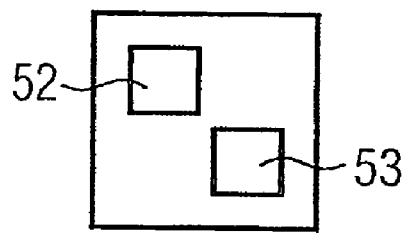
Figure 3C:
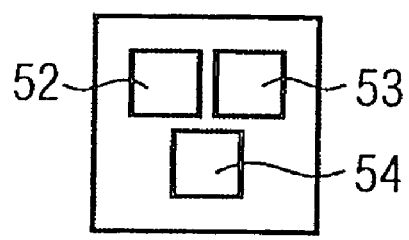
Figure 3D:
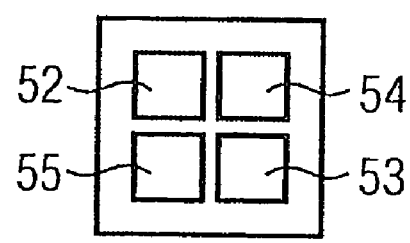

FIG. 3 shows various combinations of semiconductor chips 52-55, with FIG. 3a showing the arrangement of one semiconductor chip 52 on the light module 13, FIG. 3b showing an arrangement of two semiconductor chips 52, 53, FIG. 3c showing the arrangement of three semiconductor chips 52-54, and FIG. 3d showing the arrangement of four semiconductor chips 52-55 on the third mount element 50. The illustrated arrangements in groups of two, three and four are particularly advantageous with regard to the emission characteristic. Depending on the desired emission color, a semiconductor chip 52 can be chosen for the arrangement illustrated in 3a, which emits white, red, green or blue colored light. The use of the colors red and green is particularly ergonomically advantageous for use in a head-up display, for which reason it is recommended that semiconductor chips 52, 53, 54 which emit red and green light be used exclusively for the arrangement illustrated in FIGS. 3b, 3c. These colors allow the best legibility in virtually all environmental working conditions. If a wider choice of colors is desired, the combination of red, green and blue for three semiconductor chips 52-55 may also be chosen, if less brightness is acceptable. In accordance with the brightness and color requirements for the head-up display, it is expedient to use two semiconductor chips 52-55 which emit green light in the arrangement of three semiconductor chips 52, 53, 54 as shown in FIG. 3d.

What is claimed is:

1. A light source, comprising:
   at least one light module having a first mount element;
   a drive module with drive electronics having a second mount element;
   a common mount, said first and second mount elements being connected to said common mount such that said first and second mount elements are connected by the common mount; and
   first electrical lines connecting said at least one light module to said drive module, said first electrical lines being deformable such that thermally caused relative movements between said drive module and said at least one light module during operation of said light source are absorbed by deformation of said first electrical lines.

2. The light source of claim 1, wherein said first electrical lines comprise bonding wires.

3. The light source of claim 1, wherein said at least one light module comprises a conductor layer and at least one semiconductor chip arranged on said conductor layer such that said at least one semiconductor chip is electrically conductively connected to said conductor layer.

4. The light source of claim 1, wherein each said at least one semiconductor chip has a power consumption of at least 0.5 watts.

5. The light source of claim 3, wherein said at least one light source module includes a third mount element made from a ceramic, said conductor layer being applied to said third mount element.

6. The light source of claim 5, wherein said ceramic is a thermally conductive hybrid.

7. The light source of claim 6, wherein said ceramic is an aluminum-oxide ceramic.

8. The light source of claim 5, wherein said ceramic has a coefficient of thermal conductivity of at least 5 KIW and is an electrical insulator.

9. The light source of claim 5, wherein said third mount element is attached to said first mount element.

10. The light source of claim 3, wherein said conductor layer is composed at least partially of a mixture comprising silver and platinum.

11. The light source of claim 3, further comprising at least one second electrical line comprising a bonding wire, wherein said conductor layer includes conductor tracks connected to a surface of said at least one semiconductor chip facing away from said conductor layer by said at least one second electrical line.

12. The light source of claim 9, further comprising second electrical lines electrically connected to said drive module and third electrical lines comprising bonding wires, wherein said conductor layer includes conductor tracks connected by said third electrical lines to a junction between said third mount element and said second electrical lines.

13. The light source of claim 3, wherein said at least one light module comprises a plurality of semiconductor chips, said conductor layer comprising conductor tracks electrically conductively connected to said plurality of semiconductor chips such that at least two semiconductor chips receive independent electrical voltages by said conductor tracks.

14. The light source of claim 1, wherein said at least one light module comprises a first semiconductor chip configured to emit red-colored light and a second semiconductor chip configured to emit green-colored light.

15. The light source of claim 1, wherein said at least one light module comprises first and second semiconductor chips configured to emit red-colored light and third and fourth semiconductor chips configured to emit green-colored light.

16. The light source of claim 1, wherein said at least one light module includes three semiconductor chips, a first one of said three semiconductor chips being configured to emit red-colored light, and at least a second one of said three semiconductor chips being configured to emit green-colored light.

17. The light source of claim 1, wherein said at least one light module comprises first and second semiconductor chips configured to emit green-colored light, a third semiconductor chip configured to emit red-colored light, and a fourth semiconductor chip configured to emit blue-colored light.

18. The light source of claim 5, wherein said at least one light module includes a first printed circuit board on which said third mount element is mounted.

19. The light source of claim 18, wherein said first mount element is a printed circuit board having a flat face which rests on said common mount.

20. The light source of claim 1, wherein said common mount is a heat sink.

21. The light source of claim 1, wherein said common mount is composed of aluminum.

22. The light source of claim 1, wherein said second mount element is a printed circuit board having a flat face which rests on said common mount.

23. The light source of claim 1, wherein one of said at least one light module or said drive module is attached to said common mount by an adhesive.

24. The light source of claim 1, wherein said at least one light module comprises a plurality of light modules associated with said drive module.

25. The light source of claim 1, further comprising a temperature sensor arranged on at least one of said drive module and said at least one light module.

26. An image-production unit for a head-up display comprising the light source of claim 1.

27. The image-production unit of claim 26, wherein said light source emits light along a beam path, said image-production unit further comprising secondary optics arranged downstream of said light source in the beam path which originates from said light source.

28. The image-production unit of claim 27, wherein said secondary optics comprise a reflector.

29. The image-production unit of claim 28, wherein said reflector is totally reflective.

30. The image-production unit of claim 29, wherein said reflector includes a transmissive polymer.

31. The image-production unit of claim 29, wherein said reflector includes an external contour essentially in the form of a cone or pyramid.

32. The image-production unit of claim 28, wherein a portion of said reflector includes an input side and an output side, light from said at least one light source entering said reflector through said input side and emerging from said output side.

33. The image-production unit of claim 32, wherein said portion of said reflector emits a widening light beam which has a boundary surface forming an angle in the range of about 5°-15° with a central axis which runs centrally through the light beam in the main light propagation direction of said light source.

34. The image-production unit of claim 28, wherein said reflector comprises a convex external contour.

35. The image-production unit of claim 34, wherein said external contour of said reflector is in the form of a rotational paraboloid which widens in the main light propagation direction of said light source, the rotational paraboloid being based on a fifth-order polynomial.

36. The image-production unit of claim 28, wherein said reflector has a recess on said input side which receives light means arranged on said light source.

37. The image-production unit of claim 36, wherein said recess has a cylindrical side boundary contour which extends parallel to a central axis of said reflector.

38. The image-production unit of claim 36, wherein said recess has an end surface arranged opposite said light source in the direction of a central axis of said reflector and has convex curvature in the direction of the light source.

39. The image-production unit of claim 28, wherein said reflector has an outlet area with a diagonal size of about 20 mm.

40. The image-production unit of claim 36, wherein said recess has a diagonal size of about 5 mm.

41. The image-production unit of claim 28, wherein said light source includes a plurality of light modules, and said image-production unit comprises a plurality of said reflectors, each of said reflectors being associated with a respective one of said light modules and arranged adjacent to one another.

42. The image-production unit of claim 41, further comprising a common light-mixing module arranged downstream from the reflectors in the beam path.

43. The image-production unit of claim 42, further comprising a translucent display arranged downstream from said light-mixing module.

44. The image-production unit of claim 42, wherein said light-mixing module is in the form of a box with a light inlet side and a light outlet side, and side walls which reflect inward.

45. The image-production unit of claim 43, further comprising at least one mirror arranged in the beam path between said light-mixing module and said translucent display, said reflector folding the beam path.

46. The image-production unit of claim 43, further comprising a scattering disk arranged in the beam path between said light-mixing module and said translucent display.

* * * * *